(12) United States Patent
Shi et al.

(10) Patent No.: US 11,768,072 B2
(45) Date of Patent: Sep. 26, 2023

(54) DISTANCE MEASUREMENT METHOD AND DISTANCE MEASUREMENT SYSTEM

(71) Applicant: NORTHWEST INSTRUMENT INC.

(72) Inventors: Xin Shi, Shanghai (CN); David Xing, Dover, NJ (US)

(73) Assignee: NORTHWEST INSTRUMENT INC., Dover, NJ (US)

( * ) Notice: Subject to any disclaimer, the term of this patent is extended or adjusted under 35 U.S.C. 154(b) by 754 days.

(21) Appl. No.: 16/636,480

(22) PCT Filed: Jul. 25, 2018

(86) PCT No.: PCT/CN2018/096944
§ 371 (c)(1),
(2) Date: Feb. 4, 2020

(87) PCT Pub. No.: WO2019/024729
PCT Pub. Date: Feb. 7, 2019

(65) Prior Publication Data
US 2020/0249016 A1 Aug. 6, 2020

(30) Foreign Application Priority Data
Aug. 4, 2017 (CN) .......................... 201710661547.X

(51) Int. Cl.
*G01C 3/10* (2006.01)
*G01C 17/00* (2006.01)
*G01C 19/00* (2013.01)

(52) U.S. Cl.
CPC .............. *G01C 3/10* (2013.01); *G01C 17/00* (2013.01); *G01C 19/00* (2013.01)

(58) Field of Classification Search
CPC .......... G01C 3/10; G01C 17/00; G01C 19/00; G01C 3/00; G01C 15/006; G01S 11/12; G01S 1/703
See application file for complete search history.

(56) References Cited

U.S. PATENT DOCUMENTS 4,589,770 A * 5/1986 Jones ..................... G01S 11/12
396/107
5,243,397 A 9/1993 Friedland
(Continued)

FOREIGN PATENT DOCUMENTS

CN 101206113 A 6/2008
CN 107218920 A 9/2017
(Continued)

OTHER PUBLICATIONS

European Paten Office Supplementary European Search Report for Application No. 18840198.8, dated May 96, 2021 10 pages.
(Continued)

*Primary Examiner* — Yaritza Guadalupe-McCall
(74) *Attorney, Agent, or Firm* — ANOVA LAW GROUP, PLLC

(57) ABSTRACT

The present disclosure relates to a ranging method and a ranging system, the ranging method includes using a first laser emitting portion of a laser emitting device to emit a vertical laser beam rotating in a vertical plane at a first rotation speed; calculating a time difference between the vertical laser beam passing through a first optical detection component and a second optical detection component by using the first optical detection component and the second optical detection component on a laser receiving device at least partially on the same vertical plane, wherein a distance between the two optical detection components is a first spacing; and calculating a first distance between the laser emitting device and the laser receiving device based on the first rotation speed, the first spacing, and the time difference.

19 Claims, 5 Drawing Sheets

(56) References Cited

U.S. PATENT DOCUMENTS

| | | | |
|---|---|---|---|
| 6,133,998 A | 10/2000 | Monz et al. | |
| 7,616,845 B2* | 11/2009 | Matsuoka | G02B 6/4246 385/33 |
| 8,522,446 B1* | 9/2013 | Staudt | G01C 9/32 33/DIG. 21 |
| 11,119,202 B2* | 9/2021 | Shi | G01S 7/4816 |
| 11,150,087 B2* | 10/2021 | Shi | G01S 11/12 |
| 11,598,851 B2* | 3/2023 | Shi | G01S 17/08 |
| 11,604,275 B2* | 3/2023 | Shi | G01S 7/4814 |
| 2001/0004287 A1 | 6/2001 | Ammann | |
| 2008/0285914 A1* | 11/2008 | Matsuoka | G02B 6/29365 385/24 |
| 2015/0377604 A1* | 12/2015 | Bridges | G01S 17/66 356/4.01 |
| 2017/0184397 A1 | 6/2017 | Kamioka et al. | |
| 2018/0329035 A1* | 11/2018 | Pacala | H01L 27/1446 |
| 2020/0064449 A1* | 2/2020 | Shi | G01S 7/4816 |
| 2020/0249016 A1* | 8/2020 | Shi | G01S 1/703 |
| 2020/0249336 A1* | 8/2020 | Shi | G01S 17/08 |
| 2021/0156679 A1* | 5/2021 | Shi | G01C 15/002 |
| 2022/0120899 A1* | 4/2022 | Yan | G02B 6/4286 |
| 2022/0244050 A1* | 8/2022 | Honoki | G08C 17/02 |
| 2022/0276098 A1* | 9/2022 | Yamada | G02B 26/0833 |

FOREIGN PATENT DOCUMENTS

| | | |
|---|---|---|
| EP | 2296002 A1 | 3/2011 |
| JP | H01259214 A | 10/1989 |
| JP | 2008076052 A | 4/2008 |

OTHER PUBLICATIONS

World Intellectual Property Organization (WIPO) International Search Report for PCT/CN2018/096944 dated Nov. 27, 2018 6 pages.

* cited by examiner

DISTANCE MEASUREMENT METHOD AND DISTANCE MEASUREMENT SYSTEM

CROSS-REFERENCES TO RELATED APPLICATIONS

This application is a national phase entry under 35 U.S.C. § 371 of International Application No. PCT/CN2018/096944, filed on Jul. 25, 2018, which claims the priority to Chinese Patent Application No. 201710661547.X filed on Aug. 4, 2017, the entire contents of which are incorporated herein by reference.

TECHNICAL FIELD

The present disclosure relates to the field of ranging and positioning and, more specifically, to a ranging method and a ranging system.

BACKGROUND

In conventional technology, Chinese Published Patent Application No. CN101206113A discloses a rangefinder and a ranging method thereof. The rangefinder according to the published patent application uses a rotating light source to provide a light beam with a predetermined rotation speed, and then uses a receiver to detect the time difference when the light beam is rotated from the first position to the second position of the receiver, and calculates the distance between the receiver and the rotating light source based on the detected time difference and the distance between the first position and the second position of the receiver. The rangefinder and the ranging method described above can conveniently implement the ranging function in the laser level, thereby improving the construction convenience for the engineers.

More specifically, reference may be made to FIG. 1, which illustrates a schematic diagram of a rangefinder based on the published patent application described above. As shown in FIG. 1, in order to improve the usefulness of construction convenience for the engineers, a rangefinder 10 is constructed on a single-axis rotating laser level 11 and a receiver 12 thereof. As such, the single-axis rotating laser level 11 can not only provide an automatically leveled rotating laser beam 13 to project a horizontal reference line on the construction wall, but also assist engineers to measure the distance needed for construction marking. In particular, the receiver 12 may further include a remote control circuit 16 for remote controller the operation of the single-axis rotating laser level 11, such as the rotation speed, which can be used as a remote controller for remotely controlling the single-axis rotating laser level 11. In FIG. 1, in addition to using the a rotating light source composed of the single-axis rotating laser level 11 to provide the laser beam 13 at a predetermined rotation speed, the receiver 12 can also be used to detect the time difference when the laser beam is rotated from a first position 14 to a second position 15 of the receiver. As such, the distance between the receiver 12 and the single-axis rotating laser level 11 can be calculated based on the time difference and the distance between the first position 14 and the second position 15.

It should be apparent from the above description that a laser receiving device includes an independent first receiving circuit and a second receiving circuit. Further, the first receiving circuit and the second receiving circuit can respectively include a conversion circuit connected to a light sensor to convert the current signal into a voltage signal; an amplifier circuit connected to the conversion circuit to amplify the voltage signal; and a comparator connected to the amplifier circuit to compare the amplified voltage signal with a reference level, and output an electric signal representing the detected light beam.

Therefore, each laser receiving device needs to include at least two sets of light sensors, conversion circuits, amplifier circuits, and comparators. As such, the production cost of the laser receiving device is high, and the structure of the laser receiving device is complicated. In addition, the laser receiving device cannot ensure that the two sets of light sensors can be set up vertically. As such, when the light beam passes through the two sets of light sensors, the distance between the two points cannot be ensured to be the straight line distance between the two sets of light sensors. Therefore, the calculated distance between the light emitting position and the laser receiver device is in accurate and the error is uncontrollable.

SUMMARY

In view of the technical problems described above, that is, the technical problems of inaccurate ranging that cannot be avoided in the prior art, the present disclosure provides a ranging method. The method includes using a first laser emitting portion of a laser emitting device to emit a vertical laser beam rotating in a vertical plane at a first rotation speed; calculating a time difference between the vertical laser beam passing through a first optical detection component and a second optical detection component by using the first optical detection component and the second optical detection component on a laser receiving device at least partially on the same vertical plane, where a distance between the two optical detection components is a first spacing; and calculating a first distance between the laser emitting device and the laser receiving device based on the first rotation speed, the first spacing, and the time difference.

According to the ranging method of the present disclosure, by setting the first optical detection component and the second optical detection component on the laser receiving device at least partially on the same vertical plane, it can be ensured that the first optical detection component and the second optical detection component provided on the laser receiving device can be set horizontally. Further it can be ensured that the distance between the specific positions on the first optical detection component and the second optical detection component that the vertical laser beam rotating in a vertical plane at the first rotation speed passes through may be the first distance described above, thereby ensuring that the measured or calculated first distance between the laser emitting device and laser receiving device is accurate.

According to an embodiment of the present disclosure, the ranging method further includes using a second laser emitting portion of the laser receiving device to emit a horizontal laser beam rotating in a horizontal plane at a second rotation speed; and using a third optical detection component arranged vertically on the laser receiving device to adjust the laser receiving device to be evenly divided by the horizontal laser beam.

Those skilled in the art can understand that the term "evenly divided" herein does not mean that the horizontal laser beam is located at the exact center of the laser receiving device. The third optical detection component here is to make the distance from the vertical laser beam to the first optical detection component and the second optical detection component to be equal. As such, when the vertical laser beam is scanned across the first optical detection component and the second optical detection component, the triangle formed by the line formed by the first laser emitting portion away from the first optical detection component, the line formed by the first laser emitting portion away from the second optical detection component, and the distance between the first optical detection component and the second optical detection component may be an isosceles triangle. As such, the accuracy of the measure or calculated first distance between the laser emitting device and the laser receiving device can be further improved.

According to an embodiment of the present disclosure, the vertical setting of the laser receiving device can be implemented through a gimbal or a horizontally arranged bearing. In this way, the vertical setting of the laser receiving device can be realized in a relative simple manner or structure.

According to an embodiment of the present disclosure, the vertical setting of the laser receiving device can be implemented through an angle sensor and a control motor. In this way, the vertical setting of the laser receiving device can be realized in a relative simple manner or structure.

According to an embodiment of the present disclosure, the angle sensor is configured as a gyroscope. The gyroscope can easily and quickly identify the vertical direction, and direct the control motor to control the laser receiving device to achieve the vertical setting of the laser receiving device.

According to an embodiment of the present disclosure, the angle sensor is configured to as an electronic code disc or an electronic compass. In the era of electronic digitization, an electronic code disc or an electronic compass can easily and quickly identify the vertical direction, and direct the control motor to control the laser receiving device to achieve the vertical setting of the laser receiving device.

In addition, the present disclosure further provides a ranging system, the ranging system includes a laser emitting device, the laser emitting device including a first laser emitting portion, the first laser emitting portion is configured to emit a vertical laser beam rotating in a vertical plane at a first rotation speed; a laser receiving device including a first optical detection component and a second optical detection component at least partially on the same vertical plane, where the laser receiving device is configured to calculate a time difference between the vertical laser beam passing through the first optical detection component and the second optical detection component, and the distance between the two optical detection components is a first spacing; a determining device, the determining device is configured to calculate a first distance between the laser emitting device and the laser receiving device based on the first rotation speed, the first spacing, and the time difference.

According to an embodiment of the present disclosure, the laser receiving device further includes a second laser emitting portion configured to emit a horizontal laser beam rotating in a horizontal plane at a second rotation speed, where the laser receiving device further includes a third optical detection component configured to adjust the laser receiving device to be evenly divided by the horizontal laser beam.

According to an embodiment of the present disclosure, the vertical setting of the laser receiving device can be implemented through a gimbal or a horizontally arranged bearing.

According to an embodiment of the present disclosure, the vertical setting of the laser receiving device can be implemented through an angle sensor and a control motor.

According to an embodiment of the present disclosure, the angle sensor is configured as a gyroscope.

According to an embodiment of the present disclosure, the angle sensor is configured to as an electronic code disc or an electronic compass.

According to the ranging method and the ranging system of the present disclosure, by setting the first optical detection component and the second optical detection component on the laser receiving device at least partially on the same vertical plane, it can be ensured that the first optical detection component and the second optical detection component provided on the laser receiving device can be set horizontally. Further it can be ensured that the distance between the specific positions on the first optical detection component and the second optical detection component that the vertical laser beam rotating in a vertical plane at the first rotation speed passes through may be the first distance described above, thereby ensuring that the measured or calculated first distance between the laser emitting device and laser receiving device is accurate.

BRIEF DESCRIPTION OF THE DRAWINGS

Embodiments are illustrated and set forth with reference to the accompanying figures. These figures are for purpose of clarifying basic principles, thus only illustrating the aspects necessary for understanding the basic principles. These figures are not drawn to scale. The same reference labels have been repeated among the figures to indicate analogous features.

Other characteristics, features, advantages and benefits of the present disclosure will be more apparent from the detailed description below in connection with the accompanying figures.

DETAILED DESCRIPTION OF THE EMBODIMENTS

In the following detailed description of preferred embodiments, reference will be made to the accompanying figures which constitute a part of the present disclosure. The accompanying figures illustrate specific embodiments capable of implementing the present disclosure by way of example. The exemplary embodiments are not intended to exhaust all embodiments in accordance with the present disclosure. It can be understood that other embodiments may be utilized or structural or logical modifications may be made without departing the scope of the present disclosure. Therefore, the following detailed description is not limiting and the scope of the present disclosure is defined by the appended claims.

The applicant of the present application wishes to note that the term "horizontal setting" and "vertical setting" mentioned in the context of the present application both refer to the arrangement of the light sensing elements included in the laser receiving device. The term "vertical setting" indicates that the light sensing elements, such as stripes, include in the laser receiving device can be substantially perpendicular to the horizontal plane. The term "horizontal setting" indicates that the light sensing elements, such as stripes, include in the laser receiving device can be arranged substantially on the same horizontal plane.

Figure 1:
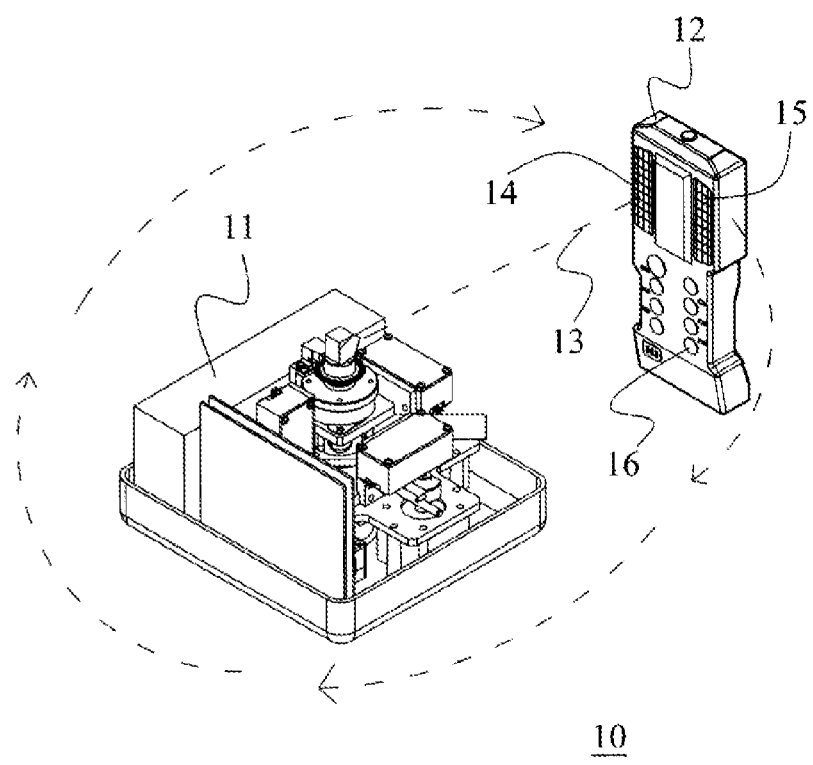
FIG. 1 illustrates a schematic diagram of a rangefinder 10 according to prior art.
Figure 2:
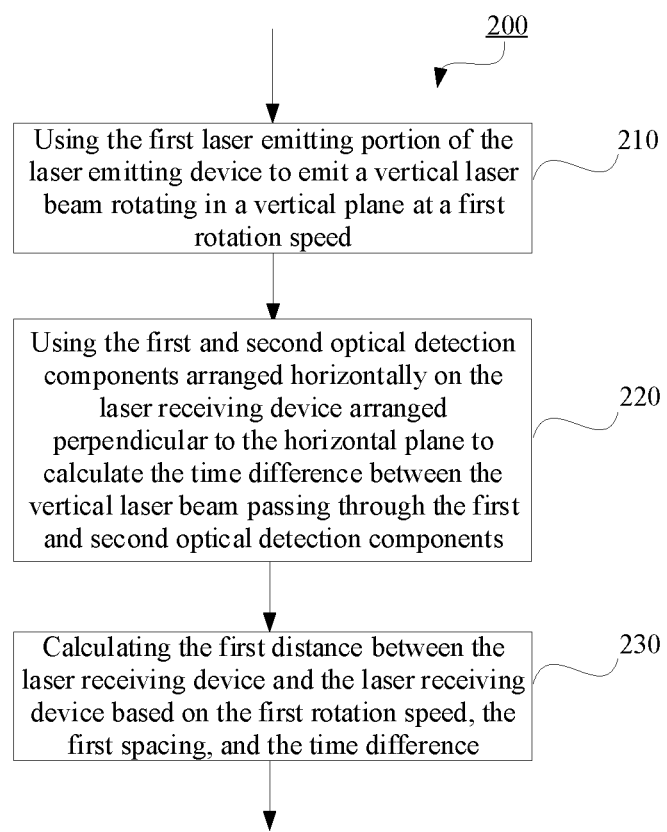
FIG. 2 illustrates a flowchart 200 of a ranging method according to the present disclosure.

In view of the technical problem that the laser receiving device in FIG. 1 cannot control the error when performing the distance measurement between the laser emitting device and the laser receiving device to perform accurate distance measurement, the present disclosure provides a ranging method. It can be seen from FIG. 2 that a ranging method 200 includes the following steps. First, in step 210, a first laser emitting portion of a laser emitting device may be used to emit a vertical laser beam rotating in a vertical plane at a first rotation speed. Next, in step 220, a first optical detection component and a second optical detection component at least partially on the same vertical plane on the laser receiving device may be used to calculate a time different between the vertical laser beam passing through the first optical detection component and the second first optical detection component. In particular, the distance between the two optical detection components may be a first spacing. Finally, in step 230, a first distance between the laser emitting device and the laser receiving device may be calculated based on the first rotation speed, the first spacing, and the time difference. According to the ranging method of the present disclosure, by setting the laser receiving device perpendicular to the horizontal plane, it may be possible to ensure that the first optical detection component and the second optical detection component provided on the laser receiving device can be set horizontally. Further, it may be ensured that the distance between the specific position on the first optical detection component and the second optical detection component that the vertical laser beam rotating in the vertical plane at the first rotation speed passes may be exactly the first spacing described above. As such, it may be possible to ensure that the measured or calculated first distance between the laser emitting device and the laser receiving device is accurate.

According to an embodiment of the present disclosure, the ranging method 200 further includes another step (not shown). That is, a second laser emitting portion of the laser emitting device may emit a horizontal laser beam rotating in a horizontal plane at a second rotation speed; and a third optical detection component provided vertically on the laser receiving device may be used to adjust the laser receiving device to be divided evenly by the horizontal laser beam. As such, the horizontal laser beam rotating in the horizontal plane at the second rotation speed can be adjusted to bisect the laser receiving device in the vertical direction, thereby further improving the accuracy of the measured or calculated first distance between the laser emitting device and the laser receiving device.

According to an embodiment of the present disclosure, the laser receiving device may be vertically arranged through a gimbal or a horizontally arranged bearing. In this way, the vertical setting of the laser receiving device can be realized in a relatively simple manner or structure. When the laser receiving device in the embodiment is vertical, the first optical detection component and the second optical detection component disposed thereon may be on the same vertical plane. It can be understood that when the first optical detection component and the second optical detection component are on the same vertical plane, the laser receiving device may not needed to be in a vertical state, which may depend on the positions of the first optical detection component and the second optical detection component on the laser receiving device. Any vertical adjustment method that can make the first optical detection component and the second optical detection component at least partially on the same vertical plane should be within the protection scope of the present disclosure.

According to an embodiment of the present disclosure, the laser receiving device may achieve vertical setting through an angle sensor and a control motor. In this way, the vertical setting of the laser receiving device can be realized in a relatively simple manner or structure.

According to an embodiment of the present disclosure, the angle sensor may be configured to as a gyroscope. The gyroscope can easily and quickly identify the vertical direction, and direct the control motor to control the laser receiving device to achieve the vertical setting of the laser receiving device. According to an embodiment of the present disclosure, the angle sensor may be configured to as an electronic code disc or an electronic compass. In the era of electronic digitization, an electronic code disc or an electronic compass can easily and quickly identify the vertical direction, and direct the control motor to control the laser receiving device to achieve the vertical setting of the laser receiving device.

Each embodiment of the laser receiving device disclosed in accordance with the present disclosure will be described below in combination with the structure of the novel laser receiving device shown in FIGS. 3-6. However, those skilled in the art should understand that the embodiments of FIG. 3 to FIG. 6 are merely exemplary and not restrictive, and are only used to exemplarily illustrate possible structural forms of the laser receiving device according to the present disclosure, and are not intended to exhaust all possible structural forms of the laser receiving device according to the present disclosure. Those skilled in the art can make modifications to these embodiments based on this technology without exceeding the concept of the present disclosure, and the modified variant are still within the protection scope of the present disclosure.

Figure 3:
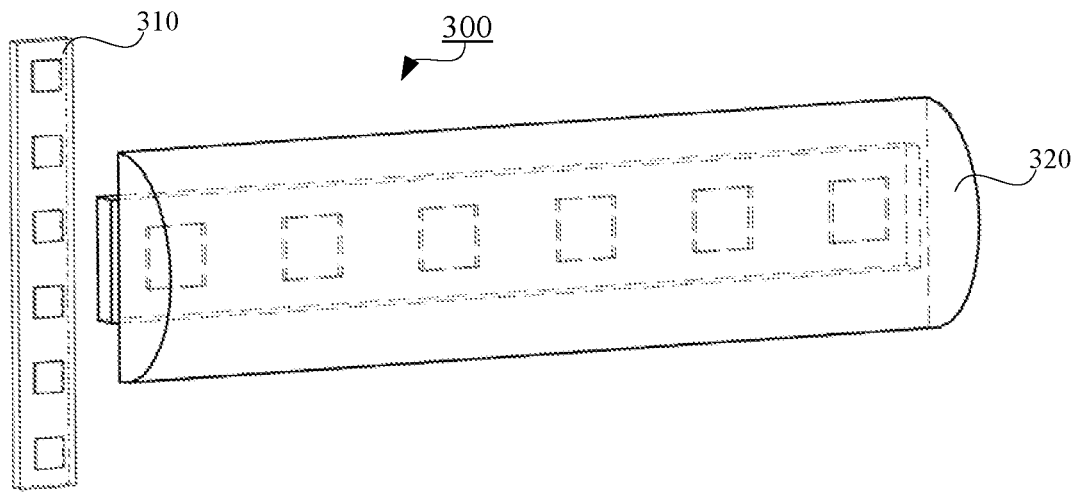
FIG. 3 illustrates a schematic diagram of a laser receiving device 300 according to an embodiment of the present disclosure.

As shown in FIG. 3, a laser receiving device 300 according to the present disclosure includes an optical detection component 310. The optical detection component 310 may be configured to receive laser light emitted by a laser emitting portion (not shown in Figure) of the laser emitting device (not shown in Figure). In addition, the laser receiving device 300 according to the present disclosure further includes an optical detection component 320. The optical detection component 320 may be configured to be disposed substantially perpendicular to the optical detection component 310. Further, the optical detection component 320 may include a first portion for receiving the laser light emitted by the laser emitting portion of the laser emitting device and a second portion for receiving the laser light emitted by the laser emitting portion of the laser emitting device. In particular, the first portion may be separated from the second portion by a first spacing. Those skilled in the art should understand that the term "first portion" herein is an implementation form of the first optical detection component. Correspondingly, the term "second portion" herein is an implementation form of the second optical detection component. The explanation here also applies to the description below.

Figure 4:
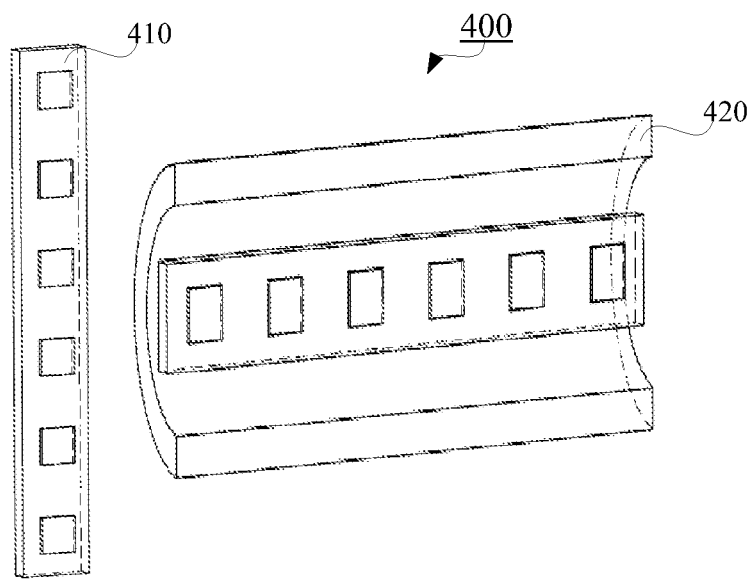
FIG. 4 illustrates a schematic diagram of a laser receiving device 400 according to another embodiment of the present disclosure.

FIG. 4 illustrates a schematic diagram of a laser receiving device 400 according to another embodiment of the present disclosure. As shown in FIG. 4, the laser receiving device 400 according to the present disclosure includes an optical detection component 410. The optical detection component 410 may be configured to receive laser light emitted by a laser emitting portion (not shown in Figure) of the laser emitting device (not shown in Figure). In addition, the laser receiving device 400 according to the present disclosure further includes an optical detection component 420. The optical detection component 420 may be configured to be disposed substantially perpendicular to the optical detection component 410. Further, the optical detection component 420 may include a first portion for receiving the laser light emitted by the laser emitting portion of the laser emitting device and a second portion for receiving the laser light emitted by the laser emitting portion of the laser emitting device. In particular, the first portion may be separated from the second portion by a first spacing.

Figure 5:
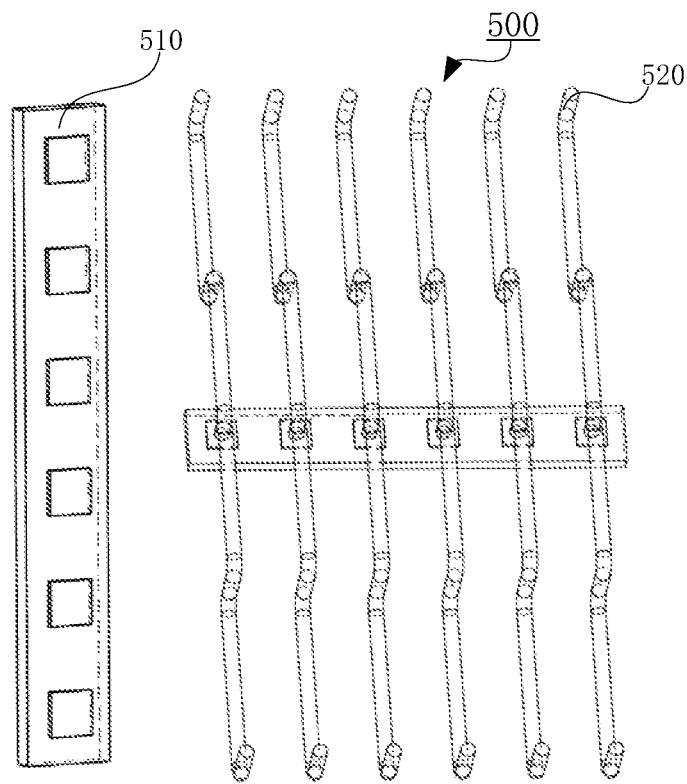
FIG. 5 illustrates a schematic diagram of a laser receiving device 500 according to yet another embodiment of the present disclosure.

FIG. 5 illustrates a schematic diagram of a laser receiving device 500 according to yet another embodiment of the present disclosure. As shown in FIG. 5, the laser receiving device 500 according to the present disclosure includes an optical detection component 510. The optical detection component 510 may be configured to receive laser light emitted by a laser emitting portion (not shown in Figure) of the laser emitting device (not shown in Figure). In addition, the laser receiving device 500 according to the present disclosure further includes an optical detection component 520. The optical detection component 520 may be configured to be disposed substantially perpendicular to the optical detection component 510. Further, the optical detection component 520 may include a first portion for receiving the laser light emitted by the laser emitting portion of the laser emitting device and a second portion for receiving the laser light emitted by the laser emitting portion of the laser emitting device. In particular, the first portion may be separated from the second portion by a first spacing.

Figure 6:
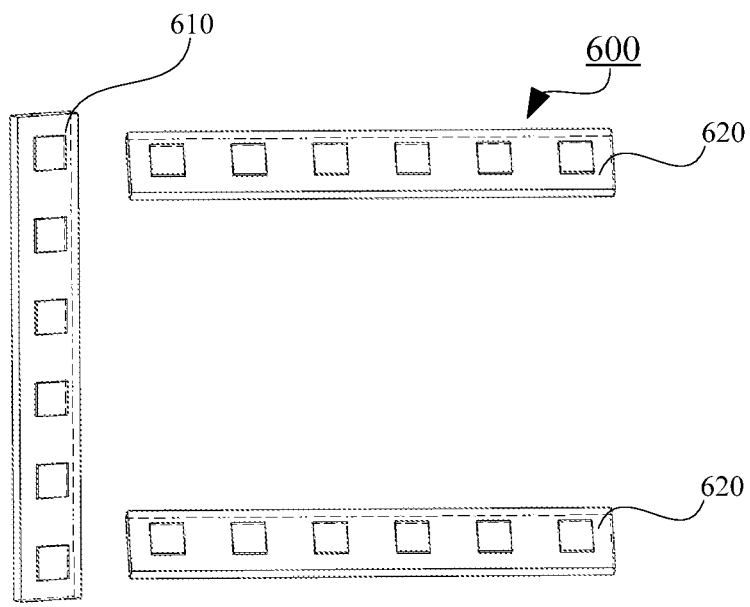
FIG. 6 illustrates a schematic diagram of a laser receiving device 600 according to still another embodiment of the present disclosure.

Finally, FIG. 6 illustrates a schematic diagram of a laser receiving device 500 according to still another embodiment of the present disclosure. As shown in FIG. 6, the laser receiving device 600 according to the present disclosure includes an optical detection component 610. The optical detection component 610 may be configured to receive laser light emitted by a laser emitting portion (not shown in Figure) of the laser emitting device (not shown in Figure). In addition, the laser receiving device 600 according to the present disclosure further includes an optical detection component 620. The optical detection component 620 may be configured to be disposed substantially perpendicular to the optical detection component 610. Further, the optical detection component 620 may include a first portion for receiving the laser light emitted by the laser emitting portion of the laser emitting device and a second portion for receiving the laser light emitted by the laser emitting portion of the laser emitting device. In particular, the first portion may be separated from the second portion by a first spacing.

According to an embodiment of the present disclosure, the laser receiving device may further include a timing module. The timing module may be configured to calculate the time difference between the times when the first portion and the second portion of the optical detection components 320, 420, 520, and 620 detect the laser light. At this time, under the condition of knowing the laser scanning speed of the laser emitting portion translated by the laser sweep and the time difference between the laser passing through the first portion and the second portion, the distance between the laser emitting device and the laser receiving device can be calculated based on the first spacing.

The first portion and the second portion may be configured to be located at two positions opposite to each other on the optical detection components 320 and 420. In the embodiment shown in FIG. 3, the light guide component 320 is a cylindrical lens, and other aspheric lenses can also be applied to this embodiment. As shown in FIG. 3, the first and second optical detection components 320 include a first portion for receiving a light beam and directing the light beam to a light sensing element (a portion shown by the dotted lines in the Figure), and a second portion for receiving a light beam and directing the light beam to the light sensing element. In this embodiment, the first portion for receiving the light beam and directing the light beam to the light sensing element and the second portion for receiving the light beam and directing the light beam to the light sensing element form a pair of measuring points. During each measurement, the laser beam may pass through each part of the pair of measuring points in turn.

In the embodiment shown in FIG. 3, the first portion and the second portion can be located on both sides of the optical detection component 320, for example, on the sides. Of course, the first portion and the second portion being located on both sides of the optical detection component 320 is merely exemplary and not restrictive, and the first portion and the second portion can also be located at other positions. For example, the first portion may be configured to as a portion that receive the light beam first and direct the light beam to the light sensing element, and the second portion may be configured to as a portion that receive the light beam last and direct the light beam to the light sensing element. In the embodiment shown in FIG. 3, the portion that receives the light beam first and directs the light beam to the light sensing element may be, for example, a first portion for receiving the light beam and directing the light beam to the light sensing element, such as an upper side. Further, the portion that receives the light beam last and directs the light beam to the light sensing element may be, for example, a second portion that receives the light beam and directs the light beam to the light sensing element, such as a lower side. By using this embodiment, measurement can be performed at the longest measuring distance, that is, the longest measuring time, such that error can be reduced and measurement accuracy may be improved.

As such, when in use, the laser receiving device 300 according to the present disclosure may be vertically set. At this time, the optical detection component 310 included in the laser receiving device 300 may also be vertically set, that is perpendicular to the horizontal plane. In this way, by using a laser emitting device capable of emitting horizontal laser light, certain adjustment steps can be used to ensure that the horizontal laser surface emitted by the laser emitting device may be between the first portion for receiving the laser light emitted by the laser emitting portion of the laser emitting device and the second portion for receiving the laser light emitted by the laser emitting portion of the laser emitting device. As such, it may be ensured that the distances of the first portion of the laser receiving device 300 for receiving the laser light emitted by the laser emitting portion of the laser emitting device and the second portion of the laser receiving device 300 for receiving the laser light emitted by the laser emitting portion of the laser emitting device to the laser emitting portion of the laser emitting device are the same. By using the corresponding configuration, it may also directly ensure that the distances from the first portion of the laser receiving device 300 for receiving the laser light emitted by the laser emitting portion of the laser emitting device and the second portion of the laser receiving device 300 for receiving the laser light emitted by the laser emitting portion of the laser emitting device to the laser emitting portion of the laser emitting device to the laser emitting portion of the laser emitting device are the same. As such, by using the rotation speed of the laser emitting portion of the laser emitting device, the first spacing between the first portion for receiving the laser light emitted from the laser emitting portion of the laser emitting device and the second portion for receiving the laser light emitted from the laser emitting portion of the laser emitting device, and the time difference between the time when the laser light passes through the first portion for receiving the laser light emitted from the laser emitting portion of the laser emitting device and the second portion for receiving the laser light emitted from the laser emitting portion of the laser emitting device. As such, the precise distance between the laser emitting device and the laser receiving device 300 can be determined through a trigonometric function relationship. The calculation of the distance between the laser receiving device and the laser receiving device 300 by using the trigonometric function relationship is common knowledge to those skilled in the art, therefore, will not be repeated here.

According to an embodiment of the present disclosure, the laser receiving device 300 may further a signal processing module (not shown in Figure). The signal processing module may be configured to process the laser light received by the optical detection component 310 and/or the laser light received by the optical detection component 320. For example, the signal processing module can perform operations such as analog-to-digital conversion on the electrical signal generated based on the laser light received through the optical detection component 310 and/or the optical detection component 320, thereby improving the transmittance and anti-interference of the electrical signal.

According to an embodiment of the present disclosure, the first portion and second portion of the optical detection component 320 may have the same length and may be disposed in parallel with each other. More specifically, in the embodiment shown in FIG. 3, the first portion and second portion are located on both sides of a semi-cylindrical optical detection component 320 (e.g., a semi-cylindrical cylindrical lens). Correspondingly, the first portion and second portion of the optical detection component 320 may have the same length and may be disposed in parallel with each other. In the embodiment shown in FIG. 4, the first portion and second portion are located on both sides of a spherical mirror-shaped optical detection component 420 (e.g., a cylindrical mirror). Correspondingly, the first portion and second portion of the optical detection component 420 may have the same length and may be disposed in parallel with each other. In the embodiment shown in FIG. 5, the optical detection component 520 includes a plurality of optical fibers arranged in parallel with each other, and these optical fibers are parallel to each other and have the same length. In addition, each optical fiber may include a fiber optic light guide on the upper and lower side as shown in the Figure. When the light beam passes, the light beam may be guided by the fiber optic light guide and transmitted to the corresponding light sensing element. Those skilled in the art should understand that the 6 optical fibers shown here are exemplary and not restrictive. Of course, the optical detection component shown in the present disclosure may include more or less than 6 optical fibers. Correspondingly, in the embodiment shown in FIG. 6, the optical detection component 620 is composed of two silicon photovoltaic modules arranged in parallel and having the same length. Those skilled in the art should understand that optical detection component may also be configured as a photoelectric sensor, which can be made of an avalanche photodiode (APD), a charge-coupled device (CCD), a silicon photovoltaic module, a solar, or other materials capable of sensing laser light.

According to an embodiment of the present disclosure, the first portion and the second portion of the optical detection components 320, 42, and 620 may be separated by the same distance from the optical detection components 310, 410, and 610. In other words, it may be necessary for the end faces of the optical detection components 320, 420, and 620 in FIGS. 3-5 and 6 to be separated from the optical detection components 310, 410, and 6110, respectively, and arranged vertical when in use.

According to an embodiment of the present disclosure, the optical detection components 320, 420, and 520 may be configured to as light guide components. The first portion of the light guide component may be configured to receive the light beam and direction the light beam to a first target position, and the second portion of the light guide component may be configured to receive the light beam and direction the light beam to the first target position. In the embodiments shown in FIGS. 2-4, the optical detection components 230, 420, and 520 are configured as light guide components. In the embodiments shown in FIGS. 3-5, the laser receiving devices 300, 400, and 500 may further include a light sensing element, and the light sensing element may be disposed at the first target position. In the embodiment shown in FIG. 6, the optical detection component 620 is configured as two separate silicon photovoltaic modules.

It can be seen from the above embodiments that elements that can be used as the optical detection components 320 and 420 in the concept of the present disclosure can be configured as, for example, spherical mirrors, free-form mirrors, aspherical mirrors, light guide columns, light guide surfaces, plane mirrors, optical fibers, or mirrors.

When the optical detection components 320, 420, and 520 are configured as light guide components, as compared with the optical detection component 620 shown in FIG. 6, only one set of light sensing element may be needed. As such, the structure of the laser receiving device can be simplified and the cost of the laser receiving device can be correspondingly reduced.

In order to further improve the processing accuracy of the electrical signal, in an embodiment of the present disclosure, the laser receiving device may further include an amplification circuit. The amplification circuit may be configured to be connected between the optical detection component and the signal processing module, and amplify the electrical signal converted from the optical signal originating from the optical detection component and output the electrical signal to the signal processing module.

In order to improve the anti-interference performance of the electrical signal in the laser receiving device, in an embodiment of the present disclosure, the laser receiving device may further include a filtering circuit. The filtering circuit may be configured to be connected between the optical detection component and the signal processing module, and filter the electrical signal converted from the optical signal originating from the optical detection component and output the electrical signal to the signal processing module.

Figure 7:
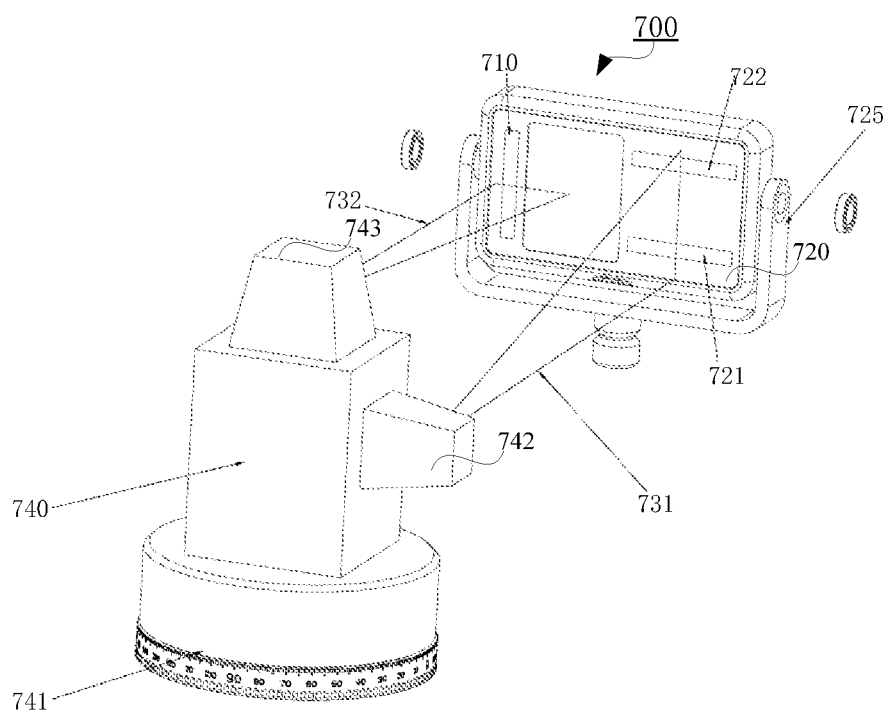
FIG. 7 illustrates a schematic diagram 700 of a ranging system according to the present disclosure.

The ranging system of the present disclosure will described below with reference to FIG. 7. As shown in FIG. 7, a ranging system 700 provided in the present disclosure includes a laser emitting device 740, the laser emitting device 740 includes a base 74. Further, the laser emitting device 740 includes a first laser emitting portion 742, the first laser emitting portion 742 is configured to emit a vertical laser beam 731 rotating in a vertical plane at a first rotation speed. Furthermore, the ranging system further includes a laser receiving device 720, the laser receiving device 720 is disposed perpendicular to the horizontal plane and includes a first optical detection component 721 and a second optical detection component 722. In particular, the laser receiving device 720 may be configured to calculate a time difference between the vertical laser beam 731 passing through the first optical detection component 721 and the second optical detection component 722, and the distance between the two optical detection components 721 and 722 may be a first spacing L. In addition, the ranging system further includes a determining device (not shown in Figure). The determining device may be configured to calculate a first distance between the laser receiving device 740 and the laser receiving device based on the first rotation speed, the first spacing, and the time difference.

In addition, it can also be seen from the Figure that the laser emitting device 740 further includes a second laser emitting device 743. The second laser emitting device 743 may be configured to emit a horizontal laser beam 732 rotating in a horizontal plane at a second rotation speed. In particular, the laser receiving device 720 further includes a third optical detection component 710. The third optical detection component 710 may be configured to adjust the laser receiving device 720 to be equally divided by the horizontal laser beam 732. According to an embodiment of the present disclosure, thee laser receiving device may be vertically arranged through a gimbal or a horizontally arranged bearing. In this way, the laser receiving device 720 can be easily and vertically set up in a vertical manner by the action of gravity. According to an embodiment of the present disclosure, the laser receiving device 720 may realize vertical setting by using an angle sensor and a control motor, that is, sensing a current suspension angle by using the angle sensor, and then realize the vertical setting by controlling the motor based on the suspension angle. According to an embodiment of the present disclosure, the angle sensor may be configured as a gyroscope. According to an embodiment of the present disclosure, the angle sensor may be configured as an electronic code disc or an electronic compass.

In the embodiment shown in FIG. 7, since the third optical detection component 710 is configured to adjust the laser receiving device 720 to be equally divided by the horizontal laser beam 732, the first laser emitting portion 742 may be configured to emit the vertical laser beam 731 rotating in a vertical plane at the first rotation speed from the first optical detection component 721 and the second optical detection component 722 at equal distances. At this time, if the time difference between the vertical laser beam 731 passing through the first optical detection component 721 and the second optical detection component 722 is $\Delta t$, the time for one rotation of the first laser emitting portion 742 is T, and the distance between the two optical detection components 721 and 722 is the first spacing L, the first distance between the laser receiving device 740 and the laser receiving device 720 may be $D=L/2/\tan(\Delta t/T*180°)$.

By setting the laser receiving device perpendicular to the horizontal plane according to the ranging method and the ranging system of the present disclosure, it can be ensured that the first optical detection component and the second optical detection component provided on the laser receiving device can be set horizontally. Further it can be ensured that the distance between the specific positions on the first optical detection component and the second optical detection component that the vertical laser beam rotating in a vertical plane at the first rotation speed passes through may be the first distance described above, thereby ensuring that the measured or calculated first distance between the laser emitting device and laser receiving device is accurate.

Those skilled in the art should understand that, various variations and modifications may be made to the various embodiments disclosed above without departing from the nature of the invention. Thus, the scope of the invention should be defined by the appended claims.

Although different exemplary embodiments have been described, it would be apparent to those skilled in the art that, different changes and modifications may be made which may implement some of the advantages of the invention without departing the spirit and scope of the invention. For those skilled in the art, other components performing the same function may be properly substituted. It should be noted that, here the features explained with reference to specific figures may be combined with the features of other figures, even if in cases where it is not explicitly mentioned. Further, methods of the invention may be implemented in all software implementations using proper processor instructions or in mixed implementations which obtain the same result utilizing the combination of hardware logics and software logics. Such modifications to the scheme in accordance with the invention are intended to be covered by the appended claims.

What is claimed is:

1. A ranging method comprising:
   emitting, by a first laser emitting portion of a laser emitting device, a vertical laser beam rotating in a vertical plane at a first rotation speed;
   calculating a time difference between the vertical laser beam passing through a first optical detection component and a second optical detection component by using the first optical detection component and the second optical detection component on a laser receiving device at least partially on the vertical plane, wherein a distance between the two optical detection components is a first spacing; and
   calculating a first distance between the laser emitting device and the laser receiving device based on the first rotation speed, the first spacing, and the time difference.

2. The ranging method of claim 1, further comprising:
   emitting, by a second laser emitting portion of the laser receiving device, to emit a horizontal laser beam rotating in a horizontal plane at a second rotation speed; and
   adjusting, by a third optical detection component arranged vertically on the laser receiving device, the laser receiving device to be evenly divided by the horizontal laser beam.

3. The ranging method of claim 1, wherein the first optical detection component and the second optical detection component are vertically arranged through a gimbal or a horizontally arranged bearing.

4. The ranging method of claim 1, wherein the first optical detection component and the second optical detection component are vertically arranged by an angle sensor and a control motor.

5. The ranging method of claim 4, wherein the angle sensor is configured as a gyroscope.

6. The ranging method of claim 4, wherein the angle sensor is configured as an electronic code disc or an electronic compass.

7. A ranging system comprising:
a laser emitting device including a first laser emitting portion configured to emit a vertical laser beam rotating in a vertical plane at a first rotation speed;
a laser receiving device including a first optical detection component and a second optical detection component at least partially on the same vertical plane, wherein the laser receiving device is configured to calculate a time difference between the vertical laser beam passing through the first optical detection component and the second optical detection component, and the distance between the two optical detection components is a first spacing; and
a determining device configured to calculate a first distance between the laser emitting device and the laser receiving device based on the first rotation speed, the first spacing, and the time difference.

8. The ranging system of claim 7, further comprising:
the laser receiving device including a second laser emitting portion configured to emit a horizontal laser beam rotating in a horizontal plane at a second rotation speed, wherein the laser receiving device further includes a third optical detection component configured to adjust the laser receiving device to be evenly divided by the horizontal laser beam.

9. The ranging system of claim 7, wherein the first optical detection component and the second optical detection component are vertically arranged through a gimbal or a horizontally arranged bearing.

10. The ranging system of claim 7, wherein the first optical detection component and the second optical detection component are vertically arranged by an angle sensor and a control motor.

11. The ranging system of claim 10, wherein the angle sensor is configured as a gyroscope.

12. The ranging system of claim 10, wherein the angle sensor is configured as an electronic code disc or an electronic compass.

13. A ranging system including a laser receiving device, the laser receiving device including:
a first optical detection component for receiving a laser light emitted by a laser emitting portion of a laser emitting device; and
a second optical detection component for receiving the laser light emitted by the laser emitting portion of the laser emitting device,
wherein the second optical detection component is disposed substantially perpendicular to the first optical detection component.

14. The ranging system of claim 13, wherein the second optical detection component includes a first portion for receiving the laser light emitted by the laser emitting portion of the laser emitting device and a second portion for receiving the laser light emitted by the laser emitting portion of the laser emitting device.

15. The ranging system of claim 14, wherein the first portion is separated from the second portion by a first spacing.

16. The ranging system of claim 14, wherein the first portion and the second portion are located on two positions opposite of each other on the second optical detection component.

17. The ranging system of claim 14, wherein the first portion and second portion of the second optical detection component have the same length and are disposed in parallel with each other.

18. The ranging system of claim 13, wherein the laser receiving device further includes a timing module for calculating a time difference between a time when the first portion of the optical detection component detects the laser light and a time when the second portion of the optical detection component detects the laser light.

19. The ranging system of claim 13, wherein the second optical detection component is a light guide component for receiving the laser light and directing the laser light to a light sensing element.

* * * * *